(12) United States Patent  (10) Patent No.: US 8,612,447 B2
Estrada Guadarrama et al.  (45) Date of Patent: Dec. 17, 2013

(54) SYSTEMS AND METHODS FOR RANKING DOCUMENT CLUSTERS

(75) Inventors: Francisco Javier Estrada Guadarrama, Toronto (CA); Darius Braziunas, Toronto (CA); Hyun Chul Lee, Thornhill (CA)

(73) Assignee: Rogers Communications Inc., Toronto, Ontario (CA)

( * ) Notice: Subject to any disclaimer, the term of this patent is extended or adjusted under 35 U.S.C. 154(b) by 133 days.

(21) Appl. No.: 13/293,190

(22) Filed: Nov. 10, 2011

(65) Prior Publication Data

US 2012/0330969 A1 Dec. 27, 2012

Related U.S. Application Data

(60) Provisional application No. 61/500,109, filed on Jun. 22, 2011.

(51) Int. Cl.
*G06F 17/30* (2006.01)
(52) U.S. Cl.
USPC .......................................... 707/737; 707/748
(58) Field of Classification Search
USPC ................................. 707/737, 748
See application file for complete search history.

(56) References Cited

U.S. PATENT DOCUMENTS

| | | | |
|---|---|---|---|
| 7,568,148 B1 * | 7/2009 | Bharat et al. ............... | 715/200 |
| 2003/0145014 A1 * | 7/2003 | Minch ........................ | 707/100 |
| 2003/0212713 A1 * | 11/2003 | Campos et al. ............. | 707/200 |
| 2004/0172394 A1 | 9/2004 | Smolsky | |
| 2004/0205461 A1 | 10/2004 | Kaufman et al. | |
| 2005/0071140 A1 * | 3/2005 | Ben-Hur et al. ............ | 703/11 |
| 2006/0179051 A1 | 8/2006 | Whitney et al. | |
| 2006/0248073 A1 | 11/2006 | Jones et al. | |
| 2007/0150802 A1 | 6/2007 | Wan et al. | |
| 2009/0070346 A1 * | 3/2009 | Savona et al. ............... | 707/100 |
| 2009/0276429 A1 | 11/2009 | Curtiss et al. | |
| 2011/0093464 A1 | 4/2011 | Cvet et al. | |
| 2011/0145219 A1 | 6/2011 | Cierniak et al. | |

OTHER PUBLICATIONS

International Search Report dated Mar. 6, 2012, PCT/CA2011/050697.

* cited by examiner

*Primary Examiner* — Khanh Pham
(74) *Attorney, Agent, or Firm* — Rowand LLP

(57) ABSTRACT

Document cluster ranking systems and methods of ranking document clusters are described. In some example embodiments, the method comprises: obtaining, at a document cluster ranking system, a value associated with a first feature for each of a plurality of document clusters; based on the values associated with the first feature, automatically generating, at the document cluster ranking system, a plurality of first feature bins, each first feature bin defining a range of values and a bin identifier; and obtaining a score for one of the document clusters, by: i) identifying the first feature bin having a range of values which includes the obtained value associated with the first feature for that one of the document clusters; and ii) determining a score for that document cluster based on the first feature bin identifier for the identified first feature bin.

26 Claims, 8 Drawing Sheets

US 8,612,447 B2

SYSTEMS AND METHODS FOR RANKING DOCUMENT CLUSTERS

CROSS-REFERENCE TO RELATED APPLICATION

This application claims the benefit of and priority to U.S. Provisional Patent Application No. 61/500,109 filed Jun. 22, 2011 under the title SYSTEM AND METHOD FOR RELEVANCE RANKING OF DIGITAL DATA.

The content of the above patent application is hereby expressly incorporated by reference into the detailed description hereof.

TECHNICAL FIELD

The present disclosure relates generally to document clustering. More specifically, it relates to methods and systems for automatically ranking document clusters.

BACKGROUND

Traditional news sources have relied on editors in order to determine the significance and prominence of stories. An editor is a person who is generally in charge of and who determines the final content of a publication, such as a newspaper or magazine.

Traditional media sources such as newspaper, television and radio now coexist with non-traditional media sources, such as micro-blogs including Twitter™. The volume of documents may be particularly large for non-traditional media sources, such as micro-blogs. Since micro-blogs provide a means for laypeople to publish comments, the number of documents which are published on a micro-blog provider system (such as Twitter™) may be extremely large. That is, the large number of potential authors can result in a large number of documents being produced.

Similarly, due to the abundance of media sources, the quantity of stories produced has become quite large. Since stories may be initiated by any person who is able to publish to a blog or micro-blog, the volume of stories increases with the number of bloggers and micro-bloggers. For example, any user with a Twitter™ account may initiate a new story.

Due to the abundance of media sources and content produced by various media sources, determining the significance and prominence of stories may be a difficult or impossible task for a traditional editor. By way of example, this task may be particularly difficult for news aggregation systems and websites. News aggregation systems and websites may analyze content from various sources and may provide access to that content through a common portal. Since news aggregation systems and websites index content from many different sources, the number of stories and documents which are indexed by such systems and websites may be quite large.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

Figure 1:
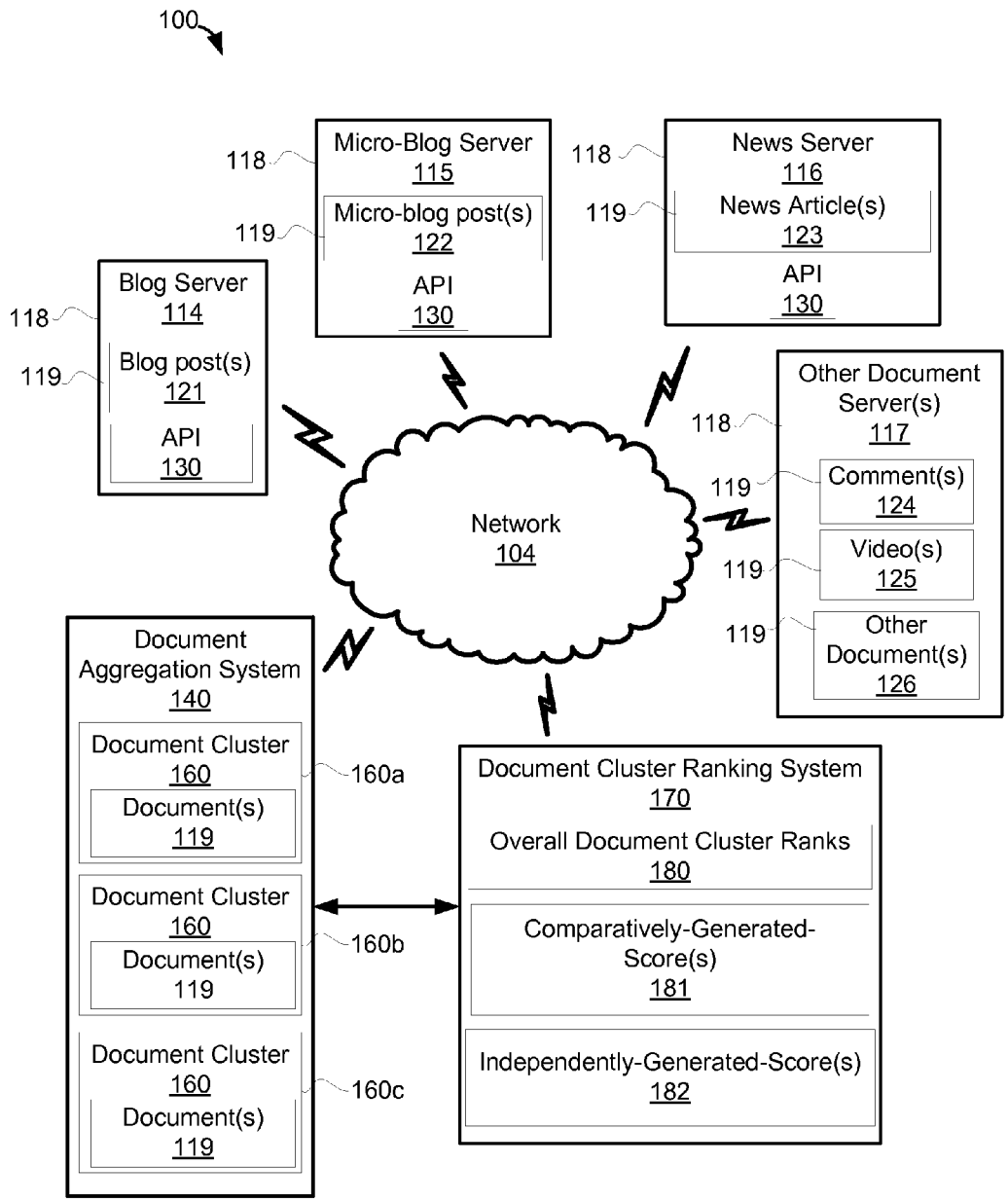
FIG. 1 shows a system diagram illustrating a possible environment in which embodiments of the present application may operate.

In one aspect, the present disclosure provides a method of ranking a document cluster. The document cluster includes one or more documents. In some example embodiments, the method includes: obtaining, at a document cluster ranking system, values associated with a first feature for each of a plurality of document clusters; based on the values associated with the first feature, automatically generating, at the document cluster ranking system, a plurality of first feature bins, each first feature bin defining a range of values and a bin identifier; and obtaining a score for one of the document clusters, by: i) identifying the first feature bin having a range of values which includes the obtained value associated with the first feature for that one of the document clusters; and ii) determining a score for that document cluster based on the first feature bin identifier for the identified first feature bin.

In a further aspect, the present disclosure describes a document cluster ranking system for ranking a document cluster which includes one or more documents. The document cluster ranking system includes a processor and a memory coupled to the processor. The memory stores processor executable instructions which, when executed by the processor cause the processor to: obtain values associated with a first feature for each of a plurality of document clusters; based on the values associated with the first feature, automatically generate a plurality of first feature bins, each first feature bin defining a range of values and a bin identifier; and obtain a score for one of the document clusters, by: i) identifying the first feature bin having a range of values which includes the obtained value associated with the first feature for that one of the document clusters; and ii) determining a score for that document cluster based on the first feature bin identifier for the identified first feature bin.

In a further aspect, the present disclosure provides a computer readable storage medium comprising computer executable instructions for: obtaining, at a document cluster ranking system, values associated with a first feature for each of a plurality of document clusters; based on the values associated with the first feature, automatically generating, at the document cluster ranking system, a plurality of first feature bins, each first feature bin defining a range of values and a bin identifier; and obtaining a score for one of the document clusters, by: i) identifying the first feature bin having a range of values which includes the obtained value associated with the first feature for that one of the document clusters; and ii) determining a score for that document cluster based on the first feature bin identifier for the identified first feature bin.

Other aspects and features of the present application will become apparent to those ordinarily skilled in the art upon review of the following description of specific embodiments of the application in conjunction with the accompanying figures.

Sample Operating Environment

Reference is first made to FIG. 1, which illustrates a system diagram of a possible operating environment 100 in which embodiments of the present disclosure may operate.

In the embodiment of FIG. 1, a document aggregation system 140 is configured to group related documents 119 together. The documents 119 which grouped by the document aggregation system 140 are machine readable documents 119, such as, for example, text based documents, video, and/or audio. These documents 119 may include, for example, blog posts 121, micro blog posts 122, news articles 123, comments 124, videos 125, and other documents 126. Other types of documents 119 may be included in the groups of related documents 119 obtained by the document aggregation system 140.

In at least some embodiments, the document aggregation system 140 is configured to analyze at least a portion of one or more machine readable documents 119 and to group related documents together. That is, the document aggregation system 140 is configured to obtain document clusters 160. Each document cluster 160 includes one or more documents 119 which are related to one another. More particularly, in at least some embodiments, the documents 119 in a document cluster 160 are related to one another by subject matter. That is, all of the documents 119 in a given document cluster 160 may be related by virtue of the fact that they all discuss a common story. The story may relate to a topic, issue, or event such as a recent event.

Some document clusters 160 may include a single document 119. This may occur, for example, where none of the other documents 119 analyzed by the document aggregation system 140 are related to the single document 119 in the document cluster 160. A single document cluster 160 may, however, include a plurality of documents 119. Where a single document cluster 160 includes a plurality of documents 119, all of the documents 119 in that document cluster 160 are related.

In the embodiment illustrated, three document clusters 160 are illustrated. These include a first document cluster 160a, a second document cluster 160b, and a third document cluster 160c. However, in other example embodiments, a greater or fewer number of document clusters 160 may be obtained. Each document cluster 160 includes one or more documents 119 which are determined, by the document aggregation system 140, to be related.

The documents 119 which are analyzed by the document aggregation system 140 and which may be included in the document clusters 160 may, for example, be documents 119 which are associated with one or more document servers 118. In some embodiments, the documents 119 may include one or more blog posts 121. A blog is a website on which an author records opinions, links to other sites, and other content on a regular basis. A blog is a form of online journal which allows user to reflect, share opinions and discuss various topics in the form of an online journal. A blog post 121 is an entry in a blog. In at least some embodiments, the blog posts 121 may be stored on and/or accessed through one or more blog server 114.

In some embodiments, the documents 119 which are analyzed by the document aggregation system 140 and which may be included in the document clusters 160 may, for example, include micro-blog posts 122. A micro-blog is a form of a blog in which the entries to the blog are typically restricted to a predetermined length. By way of example, in at least some embodiments, the micro-blog posts 122 may include Tweets™ on Twitter™. In at least some embodiments, the micro-blog posts 122 may be social networking posts including status updates, such as Facebook™ posts and updates and/or Google™ Buzz™ posts and updates. In at least some embodiments, the micro-blog posts may be restricted to one hundred and forty (140) characters. The micro-blog posts 122 may, in at least some embodiments, be stored on and/or accessed through one or more micro-blog server 115.

In some embodiments, the documents 119 which are analyzed by the document aggregation system 140 and which may be included in the document clusters 160 may, for example, include news articles 123. News articles 123 are text based documents which may, for example, contain information about recent and/or important events. In at least some embodiments, the news articles 123 may be stored on and/or accessed through one or more news servers 116.

In at least some embodiments, the documents 119 which are analyzed by the document aggregation system 140 and which may be included in the document clusters 160 may include other documents instead of or in addition to the blog posts 121, micro-blog-posts 122 and/or news articles 123. By way of example, in at least some embodiments, the documents 119 which are analyzed by the document aggregation system 140 and which may be included in the document clusters 160 may include one or more comments 124, one or more videos 125 and/or one or more other documents 126. Comments 124 may, in at least some embodiments, be documents 119 which are user-generated posts which are input within an interface which allows a user to comment about a primary document. The primary document may, for example, be a blog post 121, micro-blog post 122, news article 123, or video 12. Other types of primary documents may also be used. That is, comments 124 may be remarks which express an opinion or reaction to a primary document. Users may be given the opportunity to submit comments 124 when viewing the primary documents. In at least some embodiments, the comments may be stored on and/or accessed through the blog server 114, micro-blog server 115 or news server 116. In other embodiments, the comments 124 may be stored on and/or accessed through one or more other document servers 117.

The other document servers 117 may, in at least some embodiments, store and/or provide access to one or more videos 125 and/or other documents.

The documents 119 which are analyzed by the document aggregation system 140 are machine readable documents. The documents 119 may include, for example, text-based documents which contain data in written form. By way of example and not limitation, the documents 119 may be formatted in a Hyper-Text Markup Language ("HTML") format, a plain-text format, a portable document format ("PDF"), or in any other format which is capable of representing text or other content. Other document formats are also possible.

In at least some embodiments, the documents 119 may include documents 119 which are not text-based documents. Instead, the documents 119 may be documents which are capable of being converted to text based documents. Such documents 119 may include, for example, video or audio files. In such embodiments, the document aggregation system 140, or another system, may include a text extraction module which is configured to convert audible speech into written text. Such text may then be analyzed by the document aggregation system 140 in order to obtain the document clusters 160.

Accordingly, in at least some embodiments, the documents 119 which are analyzed by the document aggregation system 140 and which are used to form the document clusters 160 are documents 119 which are stored on a document server 118 which is accessible to the document aggregation system 140. The document aggregation system 140 may connect to the document servers 118 via a network 104, such as the Internet. In some embodiments, one or more of the document servers 118 may be a publicly and/or privately accessible web-site which may be identified by a unique Uniform Resource Locator ("URL").

The network 104 may be a public or private network, or a combination thereof. The network 104 may be comprised of a Wireless Wide Area Network (WWAN), a Wireless Local Area Network (WLAN), the Internet, a Local Area Network (LAN), or any combination of these network types. Other types of networks are also possible and are contemplated by the present disclosure.

In at least some embodiments, one or more of the document servers 118 may include an application programming interface (API) 130 which permits the document aggregation system 140 to access the documents 119 associated with that document server 118. By way of example, in some embodiments, the blog server 114 may include an API 130 which permits the document aggregation system 140 to access blog posts 121 associated with the blog server 114. Similarly, in at least some embodiments, the micro-blog server 115 may include an API 130 which permits the document aggregation system 140 to access micro-blog posts 122 associated with the micro-blog server 115. Similarly, in at least some embodiments, the news server 116 may include an API 130 which permits the document aggregation system 140 to access news articles 123 associated with the news server 116. In at least some embodiments (not shown), one or more of the other document servers 117 may include an API 130 for permitting the document aggregation system 140 to access the documents 119 associated with those other document servers 117.

The API 130 associated with any one or more of the document servers 118 may be configured to provide documents 119 associated with that document server 118 to the document aggregation system 140. For example, in at least some embodiments, an API 130 associated with a document server 118 may be configured to receive a request for one or more documents 119 from the document aggregation system 140 (or another system) and, in response, retrieve one or more documents 119 from storage and provide the retrieved document(s) to the document aggregation system 140 (or other system from which a request was received).

While in some embodiments, the API 130 of one or more of the documents servers 118 may be configured to return documents 119 to a system (such as the document aggregation system 140) in response to a request from that system, in other embodiments, one or more of the document servers 118 may provide documents 119 to a system (such as the document aggregation system 140) when other criteria is satisfied. For example, one or more of the document servers 118 may, in at least some embodiments, be configured to periodically provide documents 119 to the document aggregation system 140. For example, a document server 118 may periodically send to the document aggregation system 140 any documents 119 which have been posted since the document server 118 last sent documents 119 to the document aggregation system 140 (i.e. it may send new documents 119).

In at least some embodiments, the document aggregation system 140 may access the documents 119 on the document servers 118 in other ways. For example, in at least some embodiments, the document aggregation system 140 may include web scraping and/or crawling features. In such embodiments, the document aggregation system 140 may automatically navigate to a URL associated with a document server 118 and may index and/or retrieve one or more documents 119 associated with that document server 118.

In at least some embodiments, the document aggregation system 140 may be of the type described in United States Publication Number 2011/0093464 A1 which was filed Aug. 17, 2010 and entitled "SYSTEM AND METHOD FOR GROUPING MULTIPLE STREAMS OF DATA," the contents of which are incorporated herein by reference.

The document aggregation system 140 may include a number of systems, functions, subsystems or modules apart from those specifically discussed herein. In at least some embodiments, the document aggregation system 140 also includes a web-interface subsystem (not shown) for automatically generating web pages which permit access to documents 119 in the document clusters 160 and/or provide other information about such documents 119. The other information may include a machine-generated summary of the contents of the documents 119.

The web-pages which are generated by the web-interface subsystem may provide access to documents 119 in document clusters 160 determined by the document aggregation system 140. More particularly, the web-pages may display document clusters 160 or information associated with document clusters. Each document cluster 160 may represent a story. A user may select a story via the webpage by selecting a document cluster 160 (or by selecting other information associated with a document cluster 160) and documents 119 associated with that document cluster 160 may then be displayed (or information associated with those documents 119 may be displayed).

In at least some embodiments, the web-interface subsystem (not shown) is configured to generate web pages based on scores assigned to each of a plurality of the document clusters 160. More particularly, as will be explained in greater detail below, in at least some embodiments, a document cluster ranking system 170 may be configured to score each of a plurality of the document clusters. In at least some embodiments, the document cluster ranking system 170 may do so by assigning a score, such as a comparatively-generated-score 181 and/or independently-generated-score 182 to a document cluster 160 and/or by assigning a rank, such as an overall document cluster rank 180 to each of a plurality of document clusters. The document cluster ranking system 170 may assign such scores and/or ranks to a plurality of document clusters 160. For example, the document cluster ranking system 170 may, in at least some embodiments, assign a document cluster rank, comparatively-generated-score 181 and/or independently-generated-score 182 to each document cluster 160 obtained by the document aggregation system 140. The overall document cluster rank 180, comparatively-generated-score 181 and independently-generated-score 182 are measures of the importance of a document cluster 160. That is, the scores and ranks are metrics which describe the importance of the document cluster 160 as perceived by the document cluster ranking system 170. These scores and ranks will be discussed in greater detail below.

In at least some embodiments, the comparatively-generated-score 181 is a score which is obtained based on values associated with a feature for more than one document cluster. That is, when determining a comparatively-generated-score for one of the document clusters 160, the document cluster ranking system 170 considers values for features for other document clusters (i.e. document clusters which are not the document cluster for which a score is currently being determined). In at least some embodiments, the comparatively-generated-score differs from the independently-generated-score in that the independently-generated-score does not consider values for features for other document clusters. That is, when determining the independently-generated-score for a document cluster, the document cluster ranking system 170 does not consider the values for features for document clusters apart from the document cluster which is currently being scored. The overall document cluster ranks may be obtained based on the comparatively-generated-score 181, the independently-generated score 182, or both.

Accordingly, in at least some embodiments, the web-interface subsystem may generate one or more web-pages based on the overall document cluster ranks 180, comparatively-generated-scores 181 and/or independently-generated-scores 182 for a plurality of the document clusters 160. For example, in some embodiments, the web-pages may display identification data for document clusters 160 having a higher relative overall document cluster rank 180, comparatively-generated-score 181 and/or independently-generated-score 182 more prominently than identification data for document clusters 160 having a lower relative overall document cluster rank 180, comparatively-generated-score 181 and/or independently-generated-score 182. For example, in at least some embodiments, the generated web-pages may display identification data for document clusters 160 having a higher relative overall document cluster rank 180, comparatively-generated-score 181 and/or independently-generated-score 182 at a higher relative position than identification data for document clusters 160 having a lower relative overall document cluster rank 180, comparatively-generated-score 181 and/or independently-generated-score 182.

Accordingly, in some embodiments, the document aggregation system 140 may allow public access to documents 119 in a document cluster 160. In some such embodiments, the document aggregation system 140 provides such access by generating web pages which are accessible through a network 104 such as the Internet. The web pages may visually represent the relationship of documents by subject matter. For example, the web pages may display related documents, portions of related documents and/or or links to related documents (i.e. documents 119 in the same document cluster 160) on a common web page to indicate that such documents are related. Such related documents, portions and/or links may be displayed in close proximity to one another to visually represent the fact that the documents are related to one another.

In at least some embodiments, in order to produce an overall document cluster rank 180 for a document cluster 160, the document cluster ranking system 170 may first obtain a comparatively-generated-score 181 and/or an independently-generated-score 182 for the document cluster 160. The document cluster ranking system 170 may then obtain the overall document cluster rank 180 based on the comparatively-generated-score 181 and/or an independently-generated-score 182. The document cluster ranking system 170 and methods of scoring and ranking document clusters 160 will be described in greater detail below with reference to FIGS. 3 to 10.

The document cluster ranking system 170 is, in at least some embodiments, directly coupled to the document aggregation system 140 via wired or wireless communication interfaces. In other embodiments, the document cluster ranking system 170 and the document aggregation system 140 are connected via a network 104, such as the Internet.

The document cluster ranking system 170 and/or the document aggregation system 140 may in various embodiments, include more or less subsystems and/or functions than are discussed herein. It will also be appreciated that the functions provided by any set of systems or subsystems may be provided by a single system and that these functions are not, necessarily, logically or physically separated into different subsystems. For example, in at least some embodiments, the document cluster ranking system 170 and the document aggregation system 140 may be a single system which provides both document aggregation capabilities and also document cluster ranking capabilities. Such a system may be referred to as a document cluster ranking system 170 or a document aggregation system 140 since both document cluster ranking capabilities and document aggregation capabilities are provided.

Accordingly, the term document cluster ranking system 170 as used herein includes standalone document cluster ranking systems which are not, necessarily, part of a larger system, and also document cluster ranking systems 170 which are part of a larger system or which include other systems or subsystems. The term document cluster ranking system 170, therefore, includes any systems in which the document cluster ranking methods described herein are included.

Furthermore, while FIG. 1 illustrates one possible operating environment 100 in which the document cluster ranking system 170 may operate, it will be appreciated that the document cluster ranking system 170 may be employed in any system in which it may be useful to rank groups of documents.

Example Document Cluster Ranking System

Figure 2:
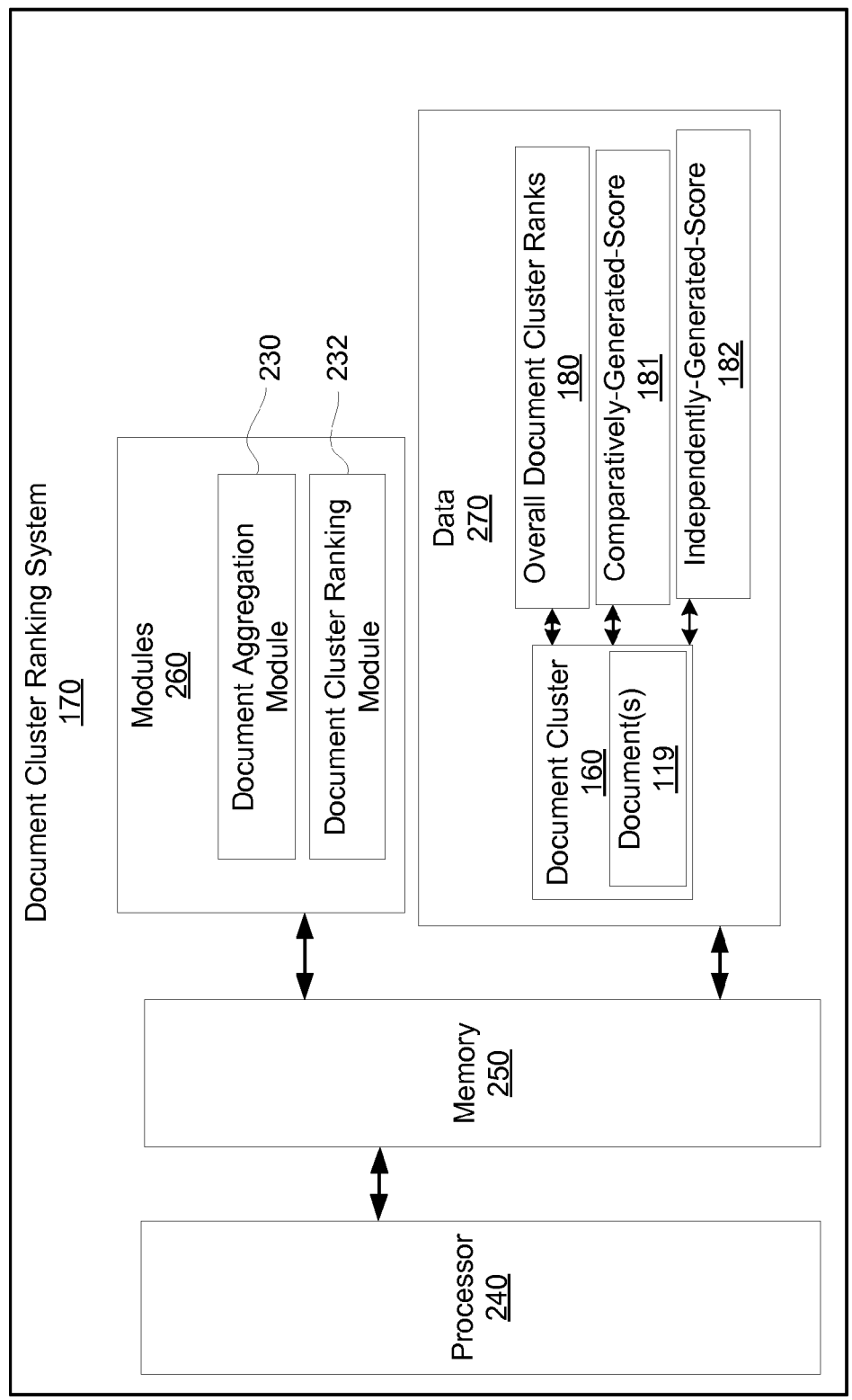
FIG. 2 shows a block diagram of a document cluster ranking system in accordance with an embodiment of the present disclosure.

Referring now to FIG. 2, a block diagram of an example document cluster ranking system 170 is illustrated. The document cluster ranking system 170 includes a controller, comprising one or more processor 240 which controls the overall operation of the document cluster ranking system 170.

The document cluster ranking system 170 includes a memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), a Solid State Drive (SSD), Flash Memory, or other types of memory. It will be appreciated that each of the various memory types will be best suited for different purposes and applications.

The processor 240 may operate under stored program control and may execute software modules 260 stored on the memory 250. In at least some embodiments, the document cluster ranking system 170 also functions as a document aggregation system 140 (FIG. 1). In such embodiments, the modules 260 may include a document aggregation module 230 which is configured to perform the functions of the document aggregation system 140. Example functions of the document aggregation system 140 are discussed above. In at least some embodiments, the document aggregation module 230 is configured to obtain a document cluster 160. The document cluster 160 may, for example, include a plurality of documents 119 which are determined by the document aggregation module 230 to be related to one another. For example, the document aggregation module 230 may find a plurality of documents 119 which are all related to the same subject matter.

In at least some embodiments, the document cluster ranking system 170 includes a document cluster ranking module 232. The document cluster ranking module 232 is configured to assign an overall document cluster rank 180, a comparatively-generated-score 181 and/or an independently-generated-score 182 to a document cluster 160. The overall document cluster rank 180, comparatively-generated-score 181 and/or independently-generated-score 182 are measures of the level of importance of the document cluster 160. The level of importance may depend, for example, on one or more features related to the document cluster 160. For example, the level of importance may depend on the number of documents 119 in the document cluster 160, the freshness of the documents 119 in the document cluster 160 (i.e. whether the documents 119 in the document cluster 160 are relatively new), or other features related to the document cluster 160. Examples features will be discussed in greater detail below with reference to FIG. 3.

In at least some embodiments, in order to produce an overall document cluster rank 180 for a document cluster 160, the document cluster ranking system 170 may first obtain a comparatively-generated-score 181 and/or an independently-generated-score 182. The comparatively-generated-score 181 may be determined based on a different feature or a different set of features than the independently-generated score 182. For example, in at least some embodiments, the document cluster ranking module 232 may determine the comparatively-generated-score 181 based on the volume of documents in the document cluster 160 and the document cluster ranking module 232 may determine the independently-generated-score 182 based on the freshness of the documents 119 in the document cluster. Then, the document cluster ranking system 170 may obtain the overall document cluster rank 180 based on the comparatively-generated-score 181, the independently-generated score 182, or both.

The document cluster ranking module 232 will be discussed in greater detail below with reference to FIGS. 3 to 9. More particularly, methods of generating a comparatively-generated-score 181 will be discussed below with reference to FIGS. 3 to 9 methods of generating an independently-generated-score 182 will be discussed below with reference to FIG. 10.

In at least some embodiments, the overall document cluster ranks 180, comparatively-generated scores 181, and/or independently-generated-scores 182 are used to determine how prominently a document cluster 160 and/or the documents 119 in that document cluster 160 will be displayed. For example, when document clusters 160 (or information about document clusters 160) are displayed in a web page, the document clusters 160 may be ordered according to their respective scores and/or ranks. A document cluster 160 with a relatively higher overall document cluster rank 180, comparatively-generated score 181, and/or independently-generated-score 182 may be displayed higher on a web page than a document with a relatively lower overall document cluster rank 180, comparatively-generated score 181, and/or independently-generated-score 182.

The document clusters 160, documents 119, overall document cluster ranks 180, comparatively-generated-scores 181, and/or independently-generated-scores 182 may, for example, be stored in a data 270 area of memory 250. The document clusters 160 may include documents 119, portions thereof, or identifying information regarding documents 119. That is, in some embodiments, the documents 119 themselves may be locally stored in the memory 250 of the document cluster ranking system 170. In other embodiments, the document clusters 160 may include pointers or links specifying where such documents 119 may be found. For example, in some embodiments, the documents 119 in the document clusters 160 may be stored on a remote server such as the document servers 118 of FIG. 1 and the document clusters 160 may specify the location of the documents 119 (such as an address associated with the document server 118 and the location of the documents 119 on the document server 118).

The memory 250 may also store other data 270 not specifically referred to above.

The document cluster ranking system 170 may be comprised of other features, components, or subsystems apart from those specifically discussed herein. By way of example and not limitation, the document cluster ranking system 170 will include a power subsystem which interfaces with a power source, for providing electrical power to the document cluster ranking system 170 and its components. By way of further example, the document cluster ranking system 170 may include a display subsystem for interfacing with a display, such as a computer monitor and, in at least some embodiments, an input subsystem for interfacing with an input device. The input device may, for example, include an alpha-numeric input device, such as a computer keyboard and/or a navigational input device, such as a mouse.

It will also be appreciated that the modules 260 may be logically or physically organized in a manner that is different from the manner illustrated in FIG. 2. By way of example, in some embodiments, two or more of the functions described with reference to two or more modules may be combined and provided by a single module. In other embodiments, functions which are described with reference to a single module may be provided by a plurality of modules. Thus, the modules 260 described with reference to FIG. 2 represent one possible assignment of features to software modules. However, such features may be organized in other ways in other embodiments.

Ranking of Document Clusters
Obtaining Comparatively-Generated Score

Figure 3:
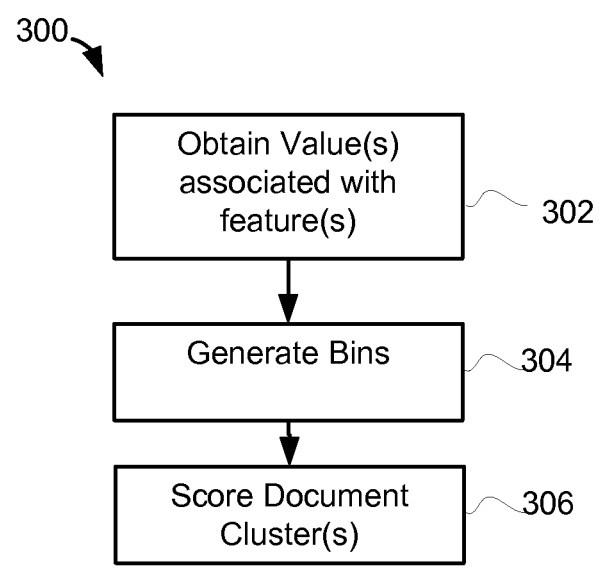
FIG. 3 is a flowchart of an example method for ranking document clusters in accordance with an embodiment of the present disclosure.

Referring now to FIG. 3, a flowchart is illustrated of a method 300 for ranking a document cluster 160. The document cluster 160 includes one or more related documents 119.

The method 300 includes steps or operations which may be performed by the document cluster ranking system 170. In at least some embodiments, the document cluster ranking system 170 may include a memory 250 (or other computer readable storage medium) which stores computer executable instructions which are executable by one or more processor 240 and which, when executed, cause the processor to perform the method 300 or a portion thereof. In some example embodiments, these computer executable instructions may be contained in one or more module 260 such as, for example, the document cluster ranking module 232 and/or the document aggregation module 230. That is, in at least some example embodiments, one or more of these modules 260 (or other software modules) may contain instructions for causing the processor 240 to perform the method 300 of FIG. 3.

In the embodiment of FIG. 3, the document cluster ranking system 170 scores one or more document clusters 160 based on one or more features related to the document clusters 160. A document cluster 160 may have a value (or other quantifier) associated with one or more features. That is, one or more of the features which are used to score and rank a document cluster 160 may be a numeric feature which may be represented by one or more numbers.

In some embodiments, one of the features used to score and/or rank the document clusters 160 may represent the number of documents 119 in a document cluster 160. Such a feature may be referred to as a number-of-documents-feature. That is, the document cluster ranking system 170 may be configured to score a document cluster 160 based on the volume of that document cluster 160 (i.e. the number of documents). In such embodiments, the value associated with the number-of-documents-feature for a document cluster may be an integer number which quantifies the number of documents. In embodiments in which a number-of-documents-feature is used, the document cluster ranking system 170 may be configured to prefer document clusters 160 which include a greater number of documents to document clusters 160 which include a lesser number of documents. That is, the document cluster ranking system 170 may be configured to provide a higher score to a document cluster if that document cluster 160 has a relatively high number of documents than if the same document cluster 160 has a relatively low number of documents.

In at least some embodiments, one of the features used to score and/or rank the document clusters 160 may be a measure of the portion of the documents in the document cluster which are blog posts. Such a feature may be referred to as a blog-post-portion-feature. That is, the document cluster ranking system 170 may be configured to score a document cluster 160 based on the blog-ratio of that document cluster 160. In such embodiments, the value associated with the blog-post-portion-feature for a document cluster 160 may be a number which represents the ratio of the number of documents in the document cluster 160 which are blogs to the total number of documents 119 in the document cluster 160 or which represents the ratio of the number of documents 119 in the document cluster 160 which are blogs to the number of documents 119 in the document cluster 160 which are not blogs. It at least some embodiments, the blog-ratio may be expressed as a percentage. In at least some embodiments, the blog-ratio may be expressed as a fraction. In other embodiments, the value associated with the blog-post-portion-feature for a document cluster 160 may be the number of blog posts in the document cluster 160. That is, an integer may be used.

In at least some embodiments, the document cluster ranking system 170 is configured to prefer stories (i.e. document clusters) which generate a buzz in the blogosphere (i.e. which have a large number of blog posts). Accordingly, in embodiments in which a blog-post-portion-feature is used, the document cluster ranking system 170 may be configured to prefer document clusters 160 which include a greater number of blog posts to document clusters 160 which include a lesser number of blogposts. That is, the document cluster ranking system 170 may be configured to provide a higher score to a document cluster if that document cluster 160 has a relatively high number (or portion) of blog posts than if the same document cluster 160 has a relatively low number (or portion) of blog posts.

In at least some embodiments, one of the features used to score and/or rank the document clusters 160 may be a measure of the number of the documents 119 in the document cluster 160 which are comments (such a feature may be referred to as a comment-quantity-feature). Comments 124 may, in at least some embodiments, be documents 119 which are user-generated posts which are input within an interface which allows a user to comment about a primary document (such as a news article or blog). The document cluster ranking system 170 may be configured to score a document cluster 160 based on the number of comments which are associated with that document cluster 160. In such embodiments, the value associated with the comment-quantity-feature may be an integer number which represents the total number of comments included in the document cluster 160. In other embodiments, the value associated with the comment-quantity-feature may be a ratio or percentage. For example, the value associated with the comment-quality-feature may be a ratio of the number of the number of documents in the document cluster 160 which are comments to the total number of documents 119 in the document cluster 160 or a ratio of the number of documents 119 in the document cluster 160 which are comments to the number of documents 119 in the document cluster 160 which are not comments. It at least some embodiments, the value associated with the comment-quantity-feature may be expressed as a percentage. In at least some embodiments, the value associated with the comment-quantity-feature may be expressed as a fraction or a decimal number.

In at least some embodiments, the document cluster ranking system 170 is configured to prefer stories (i.e. document clusters) which are talked about. That is, the document cluster ranking system 170 is configured to prefer stories (i.e. document clusters) which have a relatively large number of comments. Accordingly, in embodiments in which a comment-quality-feature is used, the document cluster ranking system 170 may be configured to prefer document clusters 160 which include a greater number of comments to document clusters 160 which include a lesser number of comments. That is, the document cluster ranking system 170 may be configured to provide a higher score to a document cluster if that document cluster 160 has a relatively high number (or portion) of comments than if the same document cluster 160 has a relatively low number (or portion) of comments.

In at least some embodiments, one of the features used to score and/or rank the document clusters 160 may be a measure of the freshness of the documents 119 in the document cluster 160 (such a feature may be referred to as a freshness-feature or hotness-feature). The document cluster ranking system 170 may be configured to score a document cluster 160 based on dates and/or times associated with the documents 119 in the document cluster 160. For example, the value associated with the freshness-feature may be an average document age of the documents 119 in the document cluster 160.

In at least some such embodiments, the document cluster ranking system 170 is configured to prefer stories (i.e. document clusters 160) which are fresher (i.e. which have a relatively large number or portion of new documents). For example, the document cluster ranking system 170 may be configured to score a document cluster 160 based on the average document age of the documents 119 in that document cluster 160. That is, the document cluster ranking system 170 may be configured to provide a higher score to a document cluster if that document cluster 160 has relatively new documents than if the same document cluster 160 had relatively older documents.

In at least some embodiments, one of the features used to score and/or rank the document clusters 160 may be a measure of the portion of the documents in the document cluster which are micro-blog posts. Such a feature may be referred to as a micro-blog-quantity-feature or Twitter™-feature where the micro-blog posts are Twitter™ posts (i.e. Tweets™). That is, the document cluster ranking system 170 may be configured to score a document cluster 160 based on the number and/or ratio of documents in the document cluster 160 which are micro-blog posts. In such embodiments, the value associated with the micro-blog-post-quantity-feature for a document cluster 160 may be a number which represents the ratio of the number of documents in the document cluster 160 which are micro-blog posts to the total number of documents 119 in the document cluster 160 or which represents the ratio of the number of documents 119 in the document cluster 160 which are micro-blogs posts to the number of documents 119 in the document cluster 160 which are not micro-blogs posts. It at least some embodiments, the value associated with the micro-blog-post-quantity-feature may be expressed as a percentage. In at least some embodiments, the value associated with the micro-blog-post-quantity-feature may be expressed as a fraction. In other embodiments, the value associated with the micro-blog-post-quantity-feature for a document cluster 160 may be the number of micro-blog posts in the document cluster 160. That is, an integer may be used.

In at least some embodiments, the document cluster ranking system 170 is configured to prefer stories (i.e. document clusters) which have a large number of micro-blog posts. Accordingly, in embodiments in which a micro-blog-quantity-feature is used, the document cluster ranking system 170 may be configured to prefer document clusters 160 which include a greater number of micro-blog posts to document clusters 160 which include a lesser number of micro-blog posts. That is, the document cluster ranking system 170 may be configured to provide a higher score to a document cluster if that document cluster 160 has a relatively high number (or portion) of micro-blog posts than if the same document cluster 160 had a relatively low number (or portion) of micro-blog posts.

The document cluster ranking system 170 may be configured to score document clusters 160 based on other features instead of or in addition to the features discussed above.

Accordingly, the document cluster ranking system 170 may be configured to score document clusters based on values associated with one or more features for a document cluster (such as the features discussed above). Referring still to FIG. 3, in at least some such embodiments, at 302, the document cluster ranking system 170 may obtain values associated with a feature (such as one of the features discussed above) for each of a plurality of document clusters 160. The feature for which the values are obtained at 302 may be referred to as a first feature.

In at least some embodiments, at 302, the document cluster ranking system 170 may obtain a value for the first feature for each of the document clusters 160 which are included in the document cluster ranking system 170. That is, the document cluster ranking system 170 may obtain a value for the first feature for all of the document clusters 160 which are associated with the document cluster ranking system 170. In at least some embodiments, the document cluster ranking system 170 may obtain a value for the first feature for all of the document clusters 160 which are obtained by the document aggregation system 140.

In other embodiments, the document cluster ranking system 170 may not obtain a value for the first feature for all of the document clusters 160. Instead, the document cluster ranking system 170 may obtain a value for the first feature for only a portion of the document clusters 160. As will be described in greater detail below with reference to FIG. 5, the values which are obtained at 302 may be used to automatically create bins for the first feature. As will be described in greater detail below, each bin represents a range of values which are each associated with a common bin identifier. Since the values obtained at 302 will be used in auto-binning (i.e. automatically generating bins), it may be desirable to obtain the values for a large number of document clusters so that the bins which are created will be accurate for a large range of document clusters. Accordingly, in at least some embodiments, at 302, the document cluster ranking system 170 may obtain a value for the first feature for a large number of document clusters 160.

Binning is a data processing technique in which original data values which fall in a given range (i.e. a bin) are replaced by a value representative of that range (i.e. a bin identifier). At 304, the document cluster ranking system 170 automatically generates bins for the first feature based on the values obtained at 302. That is, the document cluster ranking system 170 automatically generates a plurality of first feature bins based on the values associated with the first feature which were obtained at 302. Each first feature bin may define a range of values which are to be associated with that bin. That is, each first feature bin may define a range of values which may be treated as boundaries for that bin. As will be described below with reference to 306, if a document cluster has a value for the first feature which is within the range specified by a bin, then the document cluster may be assigned to that bin.

At 304, each first feature bin may be automatically assigned a bin identifier. The bin identifier is a value which is representative of the range for a bin. In at least some embodiments, the bin identifier for a bin may be a central value for the range associated with the bin. In at least some embodiments, the bin identifier may be a value which is assigned by an administrator.

Methods of automatically generating bins for a feature will be described in greater detail below with reference to FIGS. 5 to 9.

Next, at 306, the document cluster ranking system 170 may score one or more document clusters 160. The document cluster ranking system 170 may do so, for example, by identifying the appropriate bin for the value associated with the first feature for that document cluster. That is, the document cluster ranking system 170 may identify the first feature bin having a range of values which includes the value associated with the first feature for that one of the document clusters. The document cluster ranking system 170 may then determine the bin identifier associated with the identified first feature bin and may determine a score for that document cluster based on the identified bin identifier. This score may, for example, be referred to as a comparatively-generated-score 181 for a document cluster since it is obtained based on the values associated with a plurality of document clusters 160. That is, the comparatively-generated-score 181 is a score which is obtained based on values associated with a feature for more than one document cluster 160. The comparatively-generated-score 181 considers values for features associated with other document clusters 160 by generating the bins based on the values associated with a number of document clusters 160.

The ranking method 300 of FIG. 3 may be repeated for multiple document clusters 160. In at least some embodiments, after a score is assigned to a plurality of document clusters, a web-interface subsystem may generate web pages based on the relative scores assigned to each of the plurality of the document clusters 160. For example, in some embodiments, the web-pages may display identification data for document clusters 160 having a higher relative comparatively-generated-score 181 more prominently than identification data for document clusters 160 having a lower relative comparatively-generated-score 181. For example, in at least some embodiments, the generated web-pages may display identification data for document clusters 160 having a higher relative comparatively-generated-score 181 at a higher relative position than identification data for document clusters 160 having a lower relative comparatively-generated-score 181.

Obtaining Comparatively-Generated Score Based on Multiple Features

In at least some embodiments, the method 300 of ranking a document cluster may determine a comparatively-generated-score 181 for a document cluster 160 based on more than one feature. In at least some embodiments 302 and 304 may obtain values and generate bins for additional features. For example, in at least some embodiments, at 302, values associated with one or more additional features may be obtained and bins for those additional features automatically generated based on the values obtained. In at least some embodiments, the method 300 may include, at 302, obtaining values associated with a second feature for a plurality of document clusters and, at 304, automatically generating a plurality of second feature bins based on the values associated with the second feature obtained at 304. The second feature is a different feature than the first feature and may be one of the features discussed above.

Figure 4:
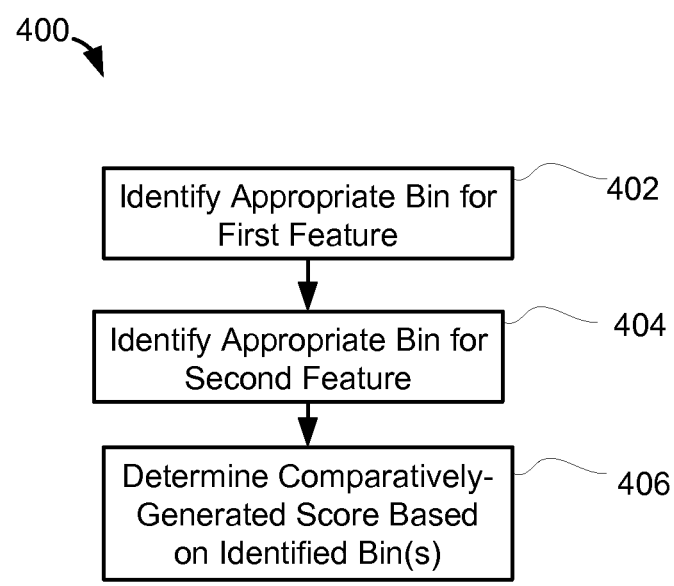
FIG. 4 is a flowchart of a method for generating a score based on values associated with multiple features in accordance with an example embodiment of the present disclosure.

In at least some such embodiments, at 306, the document cluster 160 may be scored based on the values associated with more than one feature. Referring now to FIG. 4, an example of one such method 400 of scoring a document cluster 160 based on multiple features is illustrated. The embodiment of FIG. 4 may be used at operation 306 of FIG. 3.

At 402, the document cluster ranking system 170 may identify the appropriate bin for a value associated with a first feature for a document cluster 160. This may be performed in the manner described above with reference to 306 of FIG. 3. The document cluster ranking system 170 may identify the appropriate bin for the value associated with the first feature for that document cluster 160. That is, the document cluster ranking system 170 may identify the first feature bin having a range of values which includes the value associated with the first feature for that one of the document clusters. The document cluster ranking system 170 may then determine the bin identifier associated with the identified first feature bin.

At 404, the document cluster ranking system 170 may identify the appropriate bin for a value associated with a second feature for the document cluster 160 (i.e. the same document cluster 160 used in 402). The document cluster ranking system 170 may identify the appropriate bin for a value associated with the second feature for that document cluster 160. That is, the document cluster ranking system 170 may identify the second feature bin having a range of values which includes the value associated with the second feature for that one of the document clusters 160. The document cluster ranking system 170 may then determine the bin identifier associated with the identified second feature bin.

In at least some embodiments, the document cluster ranking system 170 may identify appropriate bins for values associated with one or more additional features (such as a third feature, fourth feature, etc.). The document cluster ranking system 170 may determine the bin identifiers associated with each of these identified bins.

At 406, the document cluster ranking system 170 may determine a score (i.e. a comparatively-generated-score 181) based on the identified bins. In at least some embodiments, the document cluster ranking system 170 may determine the comparatively-generated-score 181 ("CGS") as the weighted sum of the bin identifiers for identified bins (e.g. the bins identified at 402 and 404). That is, the comparatively-generated-score may be determined as a linear combination of the bin identifiers for the document cluster 160 for each of the features, weighted appropriately.

For example, the comparatively-generated-score 181 may be determined as:

$$CGS = \sum_{i=1}^{j} \tau_i c_i,$$

where j is the number of features being used to determine the comparatively generated score 181, $\tau_i$ is the weight for feature i, and $c_i$ is the bin identifier for feature i.

In at least some embodiments, the weights for at least some of the features may be predetermined. For example, in at least some embodiments, the weights may be preconfigured by an administrator or by the document ranking system 170 itself.

Automatically Generating Bins for a Feature

Figure 5:
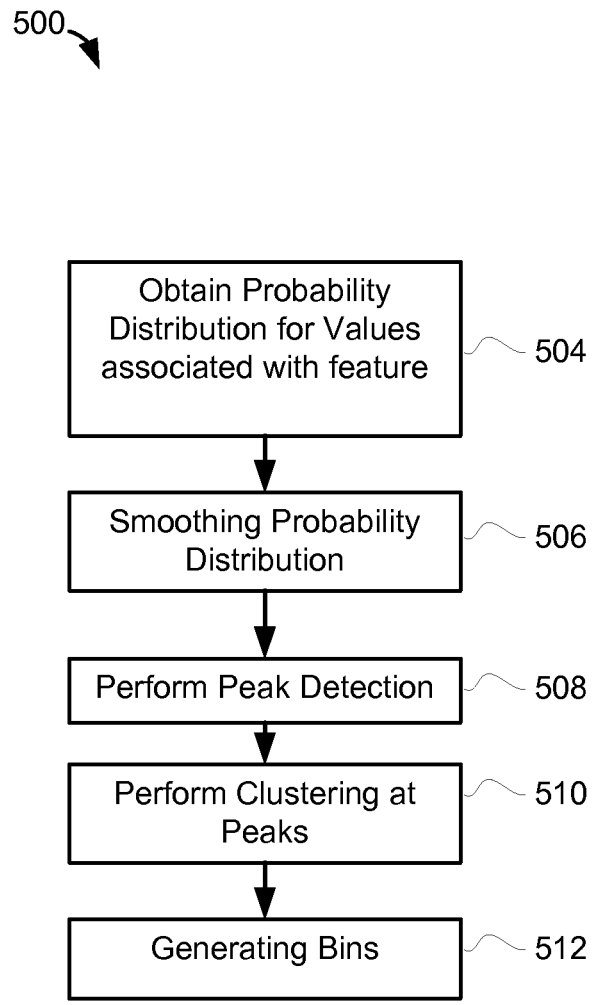
FIG. 5 is a flowchart of a method for automatically generating bins in accordance with example embodiments of the present disclosure.

Referring now to FIG. 5, a method 500 of automatically generating bins for a feature will be discussed. The method 500 may, in at least some embodiments, be used at 304 of FIG. 3.

The method 500 includes steps or operations which may be performed by the document cluster ranking system 170. In at least some embodiments, the document cluster ranking system 170 may include a memory 250 (or other computer readable storage medium) which stores computer executable instructions which are executable by one or more processor 240 and which, when executed, cause the processor to perform the method 500 or a portion thereof. In some example embodiments, these computer executable instructions may be contained in one or more module 260 such as, for example, the document cluster ranking module 232 and/or the document aggregation module 230. That is, in at least some example embodiments, one or more of these modules 260 (or other software modules) may contain instructions for causing the processor 240 to perform the method 500 of FIG. 5.

Figure 6:
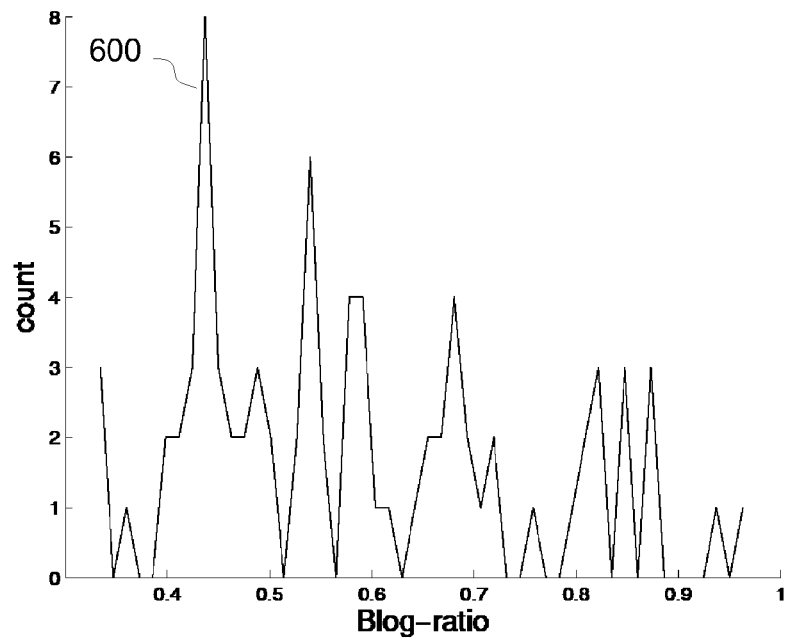
FIG. 6 is an example probability distribution of values for a feature in accordance with example embodiments of the present disclosure.

At 504, a probability distribution is obtained for values associated with the feature. The probability distribution may be generated based on the values associated with the feature across a plurality of document clusters 160 (i.e. the values obtained at 302 of FIG. 3). Referring now to FIG. 6, an example probability distribution 600 is illustrated. In the example probability distribution 600, the feature is the blog-ratio for the document clusters 160. The probability distribution 600 of values for a feature may be a histogram. More particularly, the probability distribution 600 of values for a feature may be non-parametric.

Figure 7:
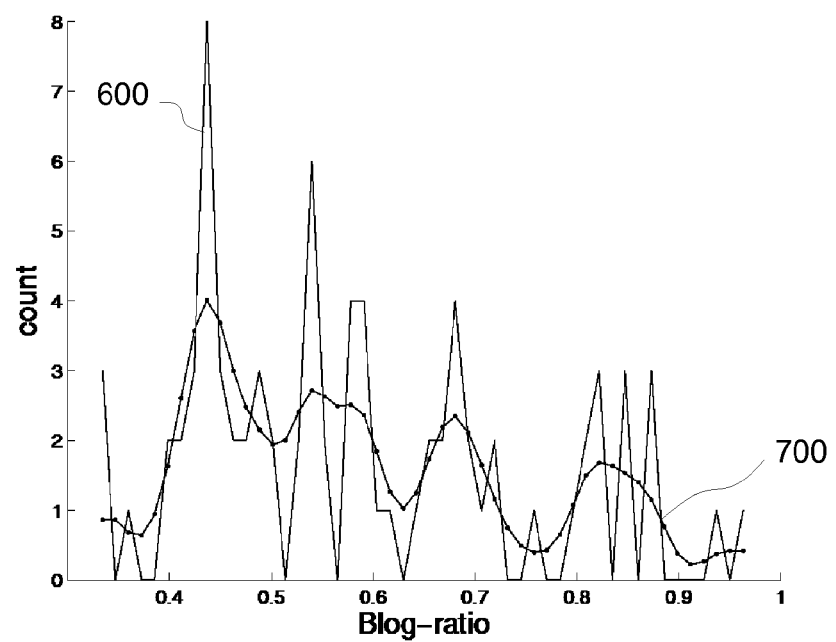
FIG. 7 is an example probability distribution of values for a feature in which smoothing has been applied in accordance with example embodiments of the present disclosure.

Referring again to FIG. 5, in at least some embodiments, at 506, the probability distribution 600 may be smoothed in order to reduce the effects of noise. More particularly, a smoothing algorithm or function may be applied to the probability distribution 600 resulting in smoothed probability distribution 700. An example smoothed probability distribution 700 is illustrated in FIG. 7.

Figure 8:
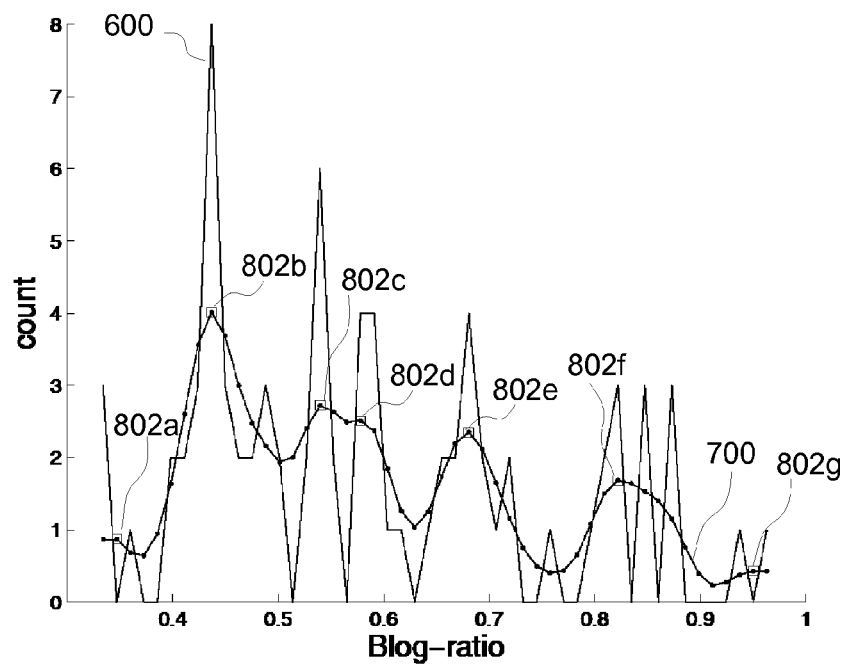
FIG. 8 is an example probability distribution of values for a feature in which peak detection has been applied in accordance with example embodiments of the present disclosure.

Referring again to FIG. 5, in at least some embodiments, peak detection may be performed on the probability distribution 600 obtained at 504 and/or the smoothed probability distribution 700 obtained at 506. Referring briefly to FIG. 8, example peaks 802a, 802b, 802c, 802d, 802e, 802f, 802g are illustrated. In FIG. 8, the example peaks are detected on the smoothed probability distribution 700. The example peaks are local maximums on the smoothed probability distribution 700.

Figure 9:
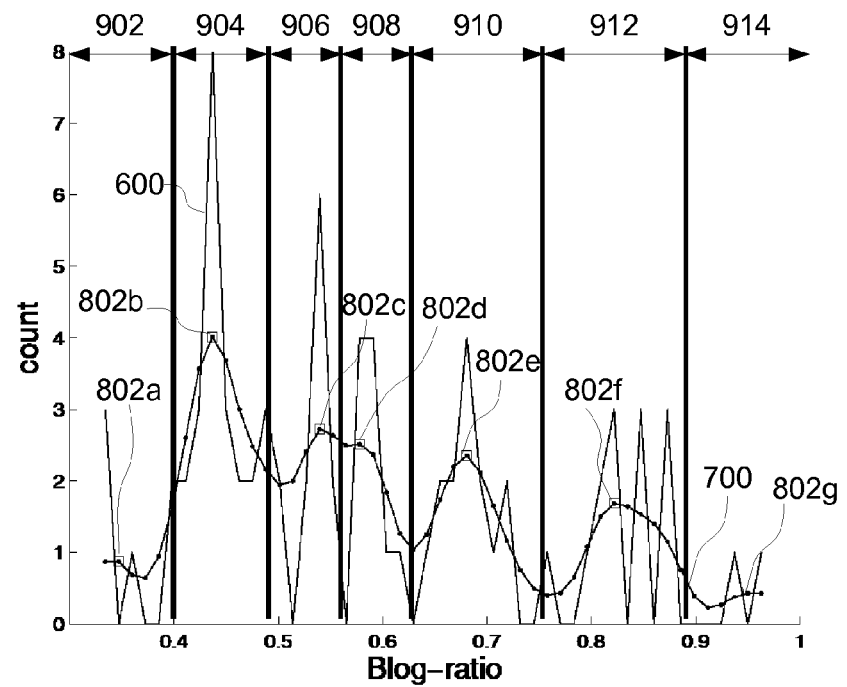
FIG. 9 is an example probability distribution of values for a feature in which clustering has been performed in accordance with example embodiments of the present disclosure.

Referring again to FIG. 5, in at least some embodiments, at 510, clustering may be performed at the detected peaks. In at least some embodiments, the clustering may be k-means clustering initialized at the peaks. That is, all values may be clustered (and not simply the peak values), but the initial clusters may be centered at the peaks. The clustering is used to obtain ranges for each bin. That is, the clustering is used in order to generate bins at 512. Example bins 902, 904, 906, 908, 910, 912, 914 are illustrated in FIG. 9. Each bin may be associated with a range and a bin identifier. The bin identifier may, for example, be the midpoint of the range associated with the bin. Accordingly, in at least some embodiments, at 512 of FIG. 5, a plurality of bins may be generated based on the probability distribution for the values, which was obtained at 504. At 512, the plurality of bins may also be generated based on peaks detected at 508 of FIG. 5.

In at least some embodiments, the method 500 may be repeated for multiple features. For example, in at least some embodiments, the method 500 may be performed for each of the features used to generate the comparatively-generated-score 181 in 406 of FIG. 4.

Obtaining Independently-Generated Score

As noted above, in at least some embodiments, the document cluster ranking system 170 may be configured to rank document clusters 160 by obtaining an independently-generated-score 182 for each of a plurality of the document clusters 160. As noted previously, in at least some embodiments, the independently-generated-score 182 may be differ from the comparatively-generated-score 181 in that the independently-generated-score 182 does not consider values for features for other document clusters 160. That is, when determining the independently-generated-score 182 for a document cluster 160, the document cluster ranking system 170 does not consider the values for features for other document clusters 160 apart from the document cluster 160 which is currently being scored.

Figure 10:
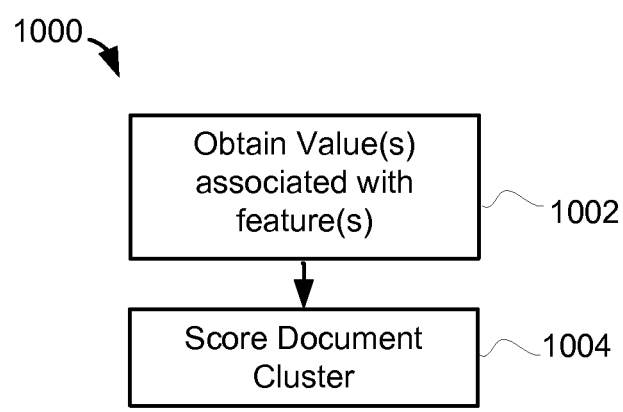
FIG. 10 is a flowchart of a method for obtaining a score for a document cluster in accordance with some example embodiments of the present disclosure.

Referring now to FIG. 10, a method 1000 of generating a score (i.e. an independently-generated-score 181) for a document cluster 160 which is not based on the values for features for other document clusters 160 is illustrated.

The method 1000 includes steps or operations which may be performed by the document cluster ranking system 170. In at least some embodiments, the document cluster ranking system 170 may include a memory 250 (or other computer readable storage medium) which stores computer executable instructions which are executable by one or more processor 240 and which, when executed, cause the processor to perform the method 1000 or a portion thereof. In some example embodiments, these computer executable instructions may be contained in one or more module 260 such as, for example, the document cluster ranking module 232 and/or the document aggregation module 230. That is, in at least some example embodiments, one or more of these modules 260 (or other software modules) may contain instructions for causing the processor 240 to perform the method 1000 of FIG. 10.

At 1002, values associated with one or more feature may be obtained for the document cluster. The features may be any of the features discussed above with reference to FIG. 3 and may include other features, not specifically discussed herein. By way of example, the features may include, for example, a number-of-documents-feature, a blog-post-portion-feature, a comment-quantity-feature, a freshness-feature, a micro-blog-quantity-feature, a Twitter™-feature. These example features are described in greater detail above with reference to FIG. 3.

Next at 1004, a score for a document cluster (i.e. the independently-generated-score) may be determined for the document cluster based on the values for the features for that document cluster 160 obtained at 1002.

More specifically, in at least some embodiments, the independently-generated-score 182 ("IGS") may be determined as a weighted sum of the values for the features obtained at 1002 for the document cluster 160.

For example, in at least some embodiments, the independently-generated-score 182 may be determined as:

$$IGS = \sum_{i=1}^{j} k_i s_i,$$

where j is the number of features being used to determine the independently-generated-score 182, $k_i$ is a weight for feature i, and $s_i$ is the value for feature i.

In at least some embodiments, the weight for a feature i, $k_i$, may be a user-specified weight. For example, a graphical user interface may be provided by the document cluster ranking system 170 which allows a user, such as an editor, to configure the weights. This allows the ranking algorithm to be customized to suit the preferences of specific editors or other users.

The method 100 of FIG. 10 may, in at least some embodiments, be repeated for a plurality of document clusters 160 to obtain scores for a plurality of document clusters 160.

Obtaining Overall Document Cluster Ranks

In some embodiments, two scores may be obtained for a document cluster. These two scores may, for example, include a comparatively-generated-score 181 and an independently-generated-score 182. In at least some embodiments, these scores may provide two different rankings for the document clusters. That is, there may be disagreement between the orders of document clusters when they are ranked according to their comparatively-generated-scores 181 as compared with when they are ranked according to their independently-generated-scores 182. To account for such disagreements, in at least some embodiments, the document cluster ranking system 170 is configured to obtain overall document cluster ranks 180 based on the comparatively-generated-scores 181 and the independently-generated-scores 182.

In one embodiment, the document cluster ranking system 170 is configured to automatically obtain overall document cluster ranks 180 which have the maximum possible agreement with the ranks (i.e. ordering) included by comparatively-generated-scores 181 and the independently-generated-scores 182.

More particularly, in at least some embodiments, the document cluster ranking system 170 is configured to minimize a loss function which evaluates the disagreement between the ranking orderings produced by the overall document cluster ranks 180 and those produced by the comparatively-generated scores 181 and the independently-generated-scores 182. Learning techniques may be employed to optimize according to the loss function.

In at least some embodiments, the document cluster ranking system 170 is configured to minimize the loss function:

$$L = \left( \sum_{a,b=1}^{N} W_{CGS}(a, b) e^{OR(b)-OR(a)} \right) \left( \sum_{a,b=1}^{N} W_{IGS}(a, b) e^{OR(b)-OR(a)} \right),$$

where a is document cluster, b is a document cluster, N is the total number of document cluster pairs, OR is the overall document cluster rank, and $W_{CGS}(a, b)$ and $W_{IGS}(a, b)$ are matrices computed as:

$$W_{CGS}(a, b) = \frac{e^{\lambda_{CGS} CGS(a)}}{e^{\lambda_{CGS} CGS(a)} + e^{\lambda_{CGS} CGS(b)}},$$

$$W_{IGS}(a, b) = \frac{e^{\lambda_{IGS} IGS(a)}}{e^{\lambda_{IGS} IGS(a)} + e^{\lambda_{IGS} IGS(b)}},$$

and where CGS is the comparatively-generated-score 181, IGS is the independently-generated-score 182 and wherein $\lambda_{CGS}$ and $\lambda_{IGS}$ are predetermined constants which control the relative importance of the comparatively-generated-score 181 and the independently-generated-score 182.

In at least some embodiments, the document cluster ranking system 170 is configured to obtain a function (which may be referred to as a boosting function) which minimizes the loss function defined above. More particularly, in at least some embodiments, the boosting function may be a linear combination of logistic regression classifiers. The parameters for the classifiers may be trained via iteratively-re weighted least squares and the weights for the linear combination may be a function of the accuracy of each classifier.

Once the boosting function has converged to stable ranking scores, the final value for the overall document cluster rank 180 for each document cluster 160 may be obtained by the document cluster ranking system 170.

While the present disclosure describes methods, a person of ordinary skill in the art will understand that the present disclosure is also directed to various apparatus, such as a server and/or a document processing system (such as a document cluster ranking system 170), including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus and articles of manufacture also come within the scope of the present disclosure.

While the methods 300, 306, 500, 1000 of FIGS. 3 to 5 and 10 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of ranking a document cluster which includes two or more documents, the method comprising:
   obtaining, at a document cluster ranking system, a value associated with a first feature for each of a plurality of document clusters;
   based on the values associated with the first feature, automatically generating, at the document cluster ranking system, for each of a plurality of first feature bins, a range of values and a bin identifier to define each of the plurality of first feature bins; and
   obtaining a score for one of the document clusters, by:
      identifying the first feature bin having a range of values which includes the obtained value associated with the first feature for that one of the document clusters; and
      determining a score for that document cluster based on the first feature bin identifier for the identified first feature bin.

2. The method of claim 1, wherein automatically generating a plurality of first feature bins comprises:
   obtaining a probability distribution of values of the first feature; and
   generating the plurality of first feature bins based on the probability distribution for the values of the first feature.

3. The method of claim 2, wherein automatically generating a plurality of first feature bins further comprises, prior to generating the plurality of first feature bins:
   performing peak detection on the probability distribution of values of the first feature, and wherein generating the plurality of first feature bins based on the probability distribution for the values of the first feature comprises generating the plurality of first feature bins based on the peaks.

4. The method of claim 3, wherein generating the plurality of first feature bins based on the peaks comprises:
   performing k-means clustering at the detected peaks.

5. The method of claim 4, further comprising, prior to performing peak detection on the probability distribution of values of the first feature, smoothing the probability distribution of values of the first feature.

6. The method of claim 2, wherein the probability distribution of values of the first feature is a histogram.

7. The method of claim 1, further comprising:
   obtaining, at a document cluster ranking system, a value associated with a second feature for each of a plurality of document clusters;
   based on the values associated with the second feature, automatically generating, at the document cluster ranking system, for each of a plurality of second feature bins, a range of values and a bin identifier to define each of the plurality of second feature bins, and wherein obtaining a score for one of the document clusters further comprises:
      identifying the second feature bin having a range of values which includes the obtained value associated with the second feature for that one of the document clusters; and
      determining the score for that document cluster based on the bin identifier for the identified second feature bin.

8. The method of claim 7, wherein the score for the document cluster is determined based on a weighted sum of bin identifiers for identified bins.

9. The method of claim 1, further comprising:
determining a second score for the one of the document clusters.

10. The method of claim 9, wherein the second score is an independently-generated-score which is determined without regard to values associated with features for other document clusters.

11. The method of claim 9, further comprising:
obtaining an overall document cluster ranking for the document cluster which provides maximum agreement between orderings of document clusters from two separate scores.

12. The method of claim 1, wherein the first feature represents the number of documents in the document cluster.

13. The method of claim 1, wherein the first feature is a measure of the portion of the documents in the document cluster which are blog posts.

14. The method of claim 1, wherein the first feature is a measure of the number of the documents in the document cluster which are comments.

15. The method of claim 1, wherein the first feature is a measure of the freshness of the documents in the document cluster.

16. The method of claim 1, wherein the first feature is a measure the portion of the plurality of documents which are micro-blog posts.

17. A document cluster ranking system for ranking a document cluster which includes two or more documents, the document cluster ranking system comprising:
a processor; and
a memory coupled to the processor, the memory storing processor executable instructions which, when executed by the processor cause the processor to:
obtain a value associated with a first feature for each of a plurality of document clusters;
based on the values associated with the first feature, automatically generate, for each of a plurality of first feature bins, a range of values and a bin identifier to define each of the plurality of first feature bins; and
obtain a score for one of the document clusters, by:
identifying the first feature bin having a range of values which includes the obtained value associated with the first feature for that one of the document clusters; and
determining a score for that document cluster based on the first feature bin identifier for the identified first feature bin.

18. The document cluster ranking system of claim 17, wherein automatically generating a plurality of first feature bins comprises:
obtaining a probability distribution of values of the first feature; and
generating the plurality of first feature bins based on the probability distribution for the values of the first feature.

19. The document cluster ranking system of claim 18, wherein automatically generating a plurality of first feature bins further comprises, prior to generating the plurality of first feature bins:
performing peak detection on the probability distribution of values of the first feature, and wherein generating the plurality of first feature bins based on the probability distribution for the values of the first feature comprises generating the plurality of first feature bins based on the peaks.

20. The document cluster ranking system of claim 19, wherein generating the plurality of first feature bins based on the peaks comprises:
performing k-means clustering at the detected peaks.

21. The document cluster ranking system of claim 20, wherein the processor is further configured to, prior to performing peak detection on the probability distribution of values of the first feature:
smooth the probability distribution of values of the first feature.

22. The document cluster ranking system of claim 17, wherein the processor is further configured to:
obtain a value associated with a second feature for each of a plurality of document clusters;
based on the values associated with the second feature, automatically generate, for each of a plurality of second feature bins, a range of values and a bin identifier to define each of the plurality of second feature bins, and wherein obtaining a score for one of the document clusters further comprises:
identifying the second feature bin having a range of values which includes the obtained value associated with the second feature for that one of the document clusters; and
determining the score for that document cluster based on the bin identifier for the identified second feature bin.

23. The document cluster ranking system of claim 22, wherein the score for the document cluster is determined based on a weighted sum of bin identifiers for identified bins.

24. The document cluster ranking system of claim 17, wherein the processor is further configured to:
determine a second score for the one of the document clusters.

25. The document cluster ranking system of claim 24, wherein the second score is an independently-generated-score which is determined without regard to values associated with features for other document clusters.

26. The document cluster ranking system of claim 24, wherein the processor is further configured to:
obtain an overall document cluster ranking for the document cluster which provides maximum agreement between orderings of document clusters from two separate scores.

* * * * *